United States Patent
Park

(10) Patent No.: US 12,378,114 B2
(45) Date of Patent: Aug. 5, 2025

(54) CHLORINE DIOXIDE COMPOSITION HAVING EXCELLENT LONG-TERM STABILITY AT ROOM TEMPERATURE AND METHOD FOR PREPARING SAME

(71) Applicant: DYC CO., LTD., Asan-si (KR)

(72) Inventor: Junho Park, Seoul (KR)

(73) Assignee: DYC CO., LTD., Asan-si (KR)

( * ) Notice: Subject to any disclaimer, the term of this patent is extended or adjusted under 35 U.S.C. 154(b) by 772 days.

(21) Appl. No.: 17/429,567

(22) PCT Filed: Nov. 12, 2020

(86) PCT No.: PCT/KR2020/015861
§ 371 (c)(1),
(2) Date: Aug. 9, 2021

(87) PCT Pub. No.: WO2021/112432
PCT Pub. Date: Jun. 10, 2021

(65) Prior Publication Data
US 2022/0153580 A1    May 19, 2022

(30) Foreign Application Priority Data
Dec. 4, 2019   (KR) .................. 10-2019-0159806

(51) Int. Cl.
*A61L 2/18* (2006.01)
*C01B 11/02* (2006.01)

(52) U.S. Cl.
CPC .................. *C01B 11/023* (2013.01)

(58) Field of Classification Search
None
See application file for complete search history.

(56) References Cited

U.S. PATENT DOCUMENTS

| | | | |
|---|---|---|---|
| 2006/0051266 A1* | 3/2006 | Green | A61L 2/20 422/292 |
| 2010/0086493 A1* | 4/2010 | Abe | C02F 1/50 424/661 |

FOREIGN PATENT DOCUMENTS

| | | | | |
|---|---|---|---|---|
| CN | 106472960 A | | 3/2017 | |
| JP | H 11-269017 A | | 10/1999 | |
| JP | 2000-63217 | * | 2/2000 | |
| JP | 2000-063217 A | | 2/2000 | |
| JP | 2005-519125 A | | 6/2005 | |
| JP | 2013-075820 A | | 4/2013 | |
| KR | 10-1997-0069116 A | | 11/1997 | |
| KR | 2011059203 A | * | 6/2011 | ............. A01N 33/02 |

OTHER PUBLICATIONS

International Search Report mailed Mar. 9, 2021, issued to corresponding International Application No. PCT/KR2020/015861.

* cited by examiner

*Primary Examiner* — Yun Qian
(74) *Attorney, Agent, or Firm* — Stein IP, LLC

(57) ABSTRACT

The present invention relates to a chlorine dioxide composition having excellent storage stability at room temperature and a method for preparing same and, more specifically, to a chlorine dioxide composition comprising an aqueous chlorine dioxide solution, chlorate, chlorite, a stabilizer containing boron and molybdenum, and a surfactant, and a method for preparing same.

7 Claims, 1 Drawing Sheet

CHLORINE DIOXIDE COMPOSITION HAVING EXCELLENT LONG-TERM STABILITY AT ROOM TEMPERATURE AND METHOD FOR PREPARING SAME

CROSS-REFERENCE TO RELATED APPLICATIONS

This application is a national stage of International Application No. PCT/KR2020/015861, filed Nov. 12, 2020, which claims the benefit of Korean Application No. 10-2019-0159806, filed Dec. 4, 2019, in the Korean Intellectual Property Office, the disclosures of which are incorporated herein by reference.

TECHNICAL FIELD

The present invention relates to a chlorine dioxide composition and a method of preparing the same, and more particularly, to a chlorine dioxide composition with excellent storage stability at room temperature and a method of preparing the same.

BACKGROUND ART

Chlorine dioxide was discovered by Sir Humphrey Dary in 1811, is a gas that has a freezing point of −59° C. and a boiling point of 11° C., and exhibits a greenish yellow color at room temperature. It smells choline weak and is easily dissolved in water and ether. Due to its powerful oxidizing power (oxidation state: +4), chlorine dioxide has a sterilizing effect, so it is widely used as a disinfectant.

The advantage of chlorine dioxide is that it does not oxidize organic matter. That is, chlorine dioxide does not generate trihalomethanes (THMs), haloacetic acids (HAAs) and other chlorinated organic compounds. In addition, chlorine dioxide is a material which is rapidly expanding as an alternative to chlorine-based disinfectants since it maintains a sterilization effect in a wide pH range, does not produce a carcinogen as a byproduct, and has an eco-friendly characteristic of being easily decomposed by light. Currently, in Korea, as notified by the Ministry of Environment (No. 1999-73), it is recognized as a disinfectant (used less than 1 ppm) in the Drinking Water Management Act.

Chlorine dioxide is slowly decomposed and converted into $ClO_2^-$, $ClO_3^-$, or $Cl^-$ during storage, as shown in the following Reaction Formula.

$$2ClO_2 + H_2O \rightarrow HClO_2 + HClO_3$$

As such, since chlorine dioxide is not being easily stored due to rapid decomposition, very difficult to prepare and not easy to analyze, a modified chlorine dioxide product which enables long-term storage, commercially called [stabilized chlorine dioxide], is being distributed. As a result of analyzing chlorine dioxide solutions provided at three water purification plants in Gyeonggi-do, Korea in 1996, it was found that these solutions were not pure chlorine dioxide, but were modified stabilized chlorine dioxide with very weak disinfecting power and causing cyanosis, as a result of the actual component analysis, it has been reported that the actual chlorine dioxide is contained only at a very small amount of 0.01 to 0.09%.

As such, there is an urgent need to develop a technique that can store and distribute chlorine dioxide, which is unstable at room temperature, for a long period of time.

Known methods of preparing chlorine dioxide include i) a super-mass production method 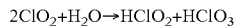 ($2NaClO_3$+ $H_2SO_3 \rightarrow 2ClO_2 + Na_2SO_4 + H_2O$) in which a starting material, a chlorate, is generated using a reducing agent ($SO_2$, HCl, $CH_3OH$ and so on) in the case of production with an acidic liquid in units of hundreds of tons a day, ii) a two-component system ($5NaClO_2 + 4HCl \rightarrow 4ClO_2 + 5NaCl + 2H_2O$) for preparing chlorine dioxide in units of tens of kg per day by oxidizing a general inorganic acid (HCl or $H_2SO_4$) and a chlorite, iii) a three-component system ($2NaClO_2 + NaClO + 2HCl \rightarrow 2ClO_2 + 3NaCl + H_2O$) for producing chlorine dioxide by reacting a chlorite, hydrochloric acid and a hypochlorite, and iv) a method of oxidizing a chlorite (sodium chlorite) with chlorine ($2NaClO_2 + Cl_2 \rightarrow 2ClO_2 + 2NaCl$).

As preparation methods, there are generally the above four preparation methods, and among these, the method of generating gaseous chlorine dioxide by reacting sodium chlorite ($NaClO_2$) with chlorine has a high yield and produces almost no byproducts.

As part of the research for increasing stability, which is the biggest disadvantage of chlorine dioxide, it is known that chlorine dioxide is partially stabilized in a hydroxide deionization system for stabilizing a halogen dioxide solution or an agent for ophthalmic treatment in the presence of citric acid.

In addition, a patent disclosing a method of stabilizing chlorine dioxide by adding sodium chlorite and adjusting pH to 2.5 to 6.8 with a pH adjuster was applied (see the related art document). In this patent, a harsh test was performed at 54° C. to confirm stability. Fourteen days at 54° C. was converted to the equivalent of one year at room temperature. However, such conversion method is not a recognized test method. The initial concentration increases from 116 ppm to 154 ppm five days after the harsh test, and there is no experimental data on whether this phenomenon occurs even at room temperature. That is, the above technique requires verification because stability at room temperature should be confirmed during actual storage for a long period such as one year, rather than confirming stability at room temperature with a harsh test.

In addition, the increase in concentration of chlorine dioxide 5 days after the harsh condition results from the production of chlorine dioxide by reaction of a chlorite added to a composition with an acid. Whereas the reaction may occur due to high temperature under harsh conditions, the reaction does not occur at room temperature. Further, the background technology in the related art document is a technique of replenishing decomposed chlorine dioxide by newly generating chlorine dioxide with a material additionally added, other than chlorine dioxide included in a composition, rather than a technique for maintaining the stability of chlorine dioxide.

Another chlorine dioxide stabilizing technique is short-term stabilizing technique in which sodium chlorite is added to an organic acid solution adjusted to pH 4 to 6, so that stabilization is maintained for a maximum of 14 days.

As described above, the stabilization techniques known so far do not have data of a room temperature experiment, or are short-term stabilization techniques, and do not guarantee a sufficient level of stabilization necessary for long-term storage and delivery or production of a detergent, and therefore, it is very necessary to develop technology for this.

(Patent Document 1) Japanese Patent Laid-Open Publication No. 2013-075820 (Apr. 25, 2013)

SUMMARY OF INVENTION

Technical Problem

To solve the above-described problems in the background art, the present invention is directed to providing a chlorine dioxide composition having long-term stability over one year at room temperature after overcoming the technology limited to short-term stability, and a method of preparing the same.

Solution to Problem

One aspect of the present invention to deal with the above technical problem provides a chlorine dioxide composition, which includes a chlorine dioxide aqueous solution, a chlorate, a chlorite, a stabilizer containing boron and molybdenum and a surfactant.

In one embodiment of the present invention, the chlorate may include at least one selected from the group consisting of sodium chlorate, potassium chlorate, lithium chlorate, calcium chlorate, magnesium chlorate, and barium chlorate.

In one embodiment of the present invention, the chlorite may include at least one selected from the group consisting of sodium chlorite, potassium chlorite, lithium chlorite, calcium chlorite, magnesium chlorite and barium chlorite.

In one embodiment of the present invention, the stabilizer containing the boron and molybdenum may be boric acid and sodium molybdate.

In one embodiment of the present invention, the surfactant may be at least one selected from the group consisting of a cationic surfactant, an anionic surfactant, an amphoteric surfactant, non-ionic surfactant, a fluorine surfactant and a saponin.

In one embodiment of the present invention, the cationic surfactant may be a fatty acid quaternary ammonium salt, the anionic surfactant may be at least one selected from the group consisting of carboxylates, sulfonates, ester sulfates, and phosphate esters, the amphoteric surfactant may be a carboxybetaine-type surfactant, and the non-ionic surfactant may be at least one selected from the group consisting of polyoxyethylene alkyl ether, polyoxyethylene glycerin fatty acid ester, polyethylene glycol fatty acid ester and fatty acid alkanolamide.

In one embodiment of the present invention, the composition may further include an antifoaming agent.

Another aspect of the present invention provides a method of preparing a chlorine dioxide composition, which includes: forming a mixed solution by adding a chlorate and a chlorite to a chlorine dioxide aqueous solution, and stirring the resulting solution at room temperature; and adding a stabilizer containing boron and molybdenum and a surfactant to the mixed solution.

In one embodiment of the present invention, the chlorate may include at least one selected from the group consisting of sodium chlorate, potassium chlorate, lithium chlorate, calcium chlorate, magnesium chlorate and barium chlorate.

In one embodiment of the present invention, the chlorite may include at least one selected from the group consisting of sodium chlorite, potassium chlorite, lithium chlorite, calcium chlorite, magnesium chlorite and barium chlorite.

In one embodiment of the present invention, the stabilizer containing boron and molybdenum may be a mixture of boric acid and sodium molybdate.

In one embodiment of the present invention, the surfactant may include at least one selected from the group consisting of a cationic surfactant, an anionic surfactant, an amphoteric surfactant, a non-ionic surfactant, a fluorinated surfactant and a saponin.

In one embodiment of the present invention, the cationic surfactant may be a fatty acid quaternary ammonium salt, the anionic surfactant may be at least one selected from the group consisting of carboxylates, sulfonates, ester sulfates, and phosphate esters, the amphoteric surfactant may be a carboxybetaine-type surfactant, and the non-ionic surfactant may be at least one selected from the group consisting of polyoxyethylene alkyl ether, polyoxyethylene glycerin fatty acid ester, polyethylene glycol fatty acid ester and fatty acid alkanolamide.

In one embodiment of the present invention, in the step of adding a surfactant, an antifoaming agent for controlling the bubble generation by a surfactant may be further added.

Still another aspect of the present invention provides a chlorine dioxide propellant, in which the chlorine dioxide composition is dissolved in a high-pressure gas, and the high-pressure gas includes at least one selected from the group consisting of liquefied natural gas (LPG), liquefied butane and dimethyl ether.

Yet another aspect of the present invention provides a method of storing a chlorine dioxide composition for a long time, in which the chlorine dioxide composition is maintained weakly acidic, and has a change rate of within 10%, as calculated by the following Formula (4).

$$\text{Long-term concentration change rate (\%)} = \{(A1-A2) \div A1\} \times 100 \quad \text{Formula(4)}$$

In Formula (4), A1 is the maximum concentration value during storage at room temperature, and A2 is the minimum concentration value during storage at room temperature.

Advantageous Effects of Invention

The present invention provides a chlorine dioxide composition which has improved long-term storage stability over one year at room temperature, and a method of preparing the same. The chlorine dioxide composition of the present invention is a disinfectant which is advantageous for delivery and distribution, has strong disinfection power and an eco-friendly advantage as replacing the use of modified stabilized chlorine dioxide which has low disinfection power and a risk of cyanosis, and has very improved stability in long-term storage at room temperature.

DETAILED DESCRIPTION OF EMBODIMENT

Figure 1:
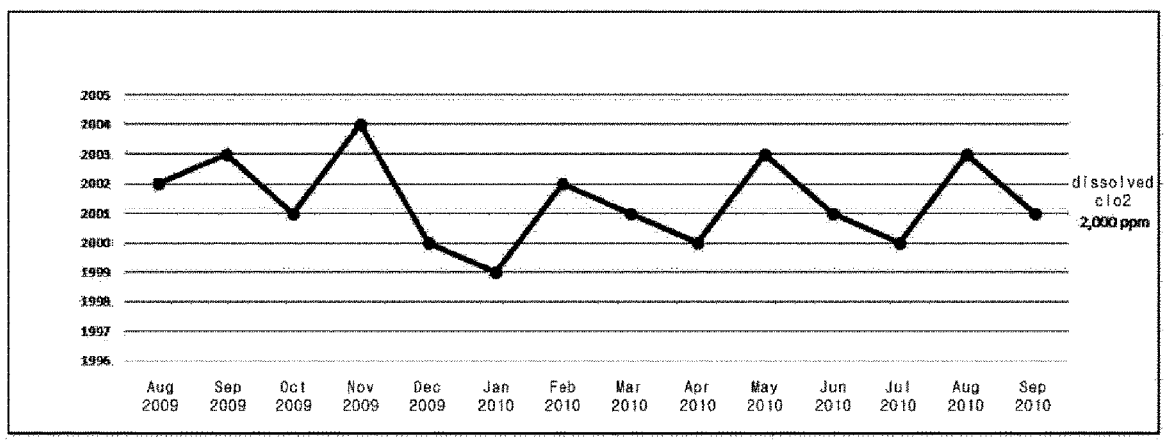
FIG. 1 is a graph showing the change in concentration of chlorine dioxide over time (long-term stability) for a composition in which the initial concentration of the chlorine dioxide of Example 1 is 2,000 ppm.

Hereinafter, the present invention will be described in further detail with reference to embodiments or examples, including the accompanying drawings. However, the following specific embodiments or examples are merely provided as references to describe the present invention in detail, but are not limited, and may be embodied in various forms.

In addition, unless defined otherwise, all technical and scientific terms have the same meaning as commonly understood by one of ordinary skill in the art to which the invention belongs. The terms used in the description of the present invention are merely provided to effectively describe specific embodiments, but not intended to limit the present invention.

In addition, the singular forms used in the specification and the accompanying claims include plural forms unless specifically indicated otherwise.

In addition, when one part "includes" one component, it means that, unless specifically stated otherwise, another component may be further included, rather than excluding the other component.

A chlorine dioxide composition of the present invention includes a chlorine dioxide aqueous solution, a chlorate, a chlorite, a stabilizer containing boron and molybdenum and a surfactant.

The present invention will be described in detail below.

The chlorate may include at least one selected from the group consisting of sodium chlorate, potassium chlorate, lithium chlorate, calcium chlorate, magnesium chlorate, and barium chlorate. In terms of economic feasibility and continuity of chlorine dioxide production, the chlorate is preferably sodium chlorate or potassium chlorate, and more preferably sodium chlorate. However, the present invention is not limited thereto.

The chlorate may be included at 0.05 to 1 wt %, and more specifically, 0.1 to 0.8 wt % with respect to 1 L of a chlorine dioxide aqueous solution containing 1 to 2000 mg/L chlorine dioxide. However, the present invention is not limited thereto.

The chlorite may include at least one selected from the group consisting of sodium chlorite, potassium chlorite, lithium chlorite, calcium chlorite, magnesium chlorite and barium chlorite. In terms of economic feasibility and continuity of chlorine dioxide production, the chlorite is preferably sodium chlorite or potassium chlorite, and more preferably sodium chlorite. However, the present invention is not limited thereto.

The chlorite may be included at 0.2 to 2.0 wt %, and more particularly, 0.5 to 1.8 wt % with respect to 1 L of a chlorine dioxide aqueous solution containing 1 to 2000 mg/L chlorine dioxide. However, the present invention is not limited thereto.

The surfactant may include at least one selected from the group consisting of a cationic surfactant, an anionic surfactant, an amphoteric surfactant, a non-ionic surfactant, a fluorinated surfactant and a saponin.

The surfactant may be included at 0.01 to 0.5 wt %, and more particularly, 0.05 to 0.3 wt % with respect to 1 L of a chlorine dioxide aqueous solution containing 1 to 2000 mg/L chlorine dioxide. However, the present invention is not limited thereto.

The cationic surfactant may be a fatty acid quaternary ammonium salt, the anionic surfactant may be at least one selected from the group consisting of carboxylates such as polyoxyethylene alkylether carboxylic acid, sulfonates such as alkylbenzenesulfonate and alkylnaphthalenesulfonate, ester sulfates such as higher alcohol ester sulfates, and ester phosphates such as polyoxyethylene alkyl ether phosphate, the amphoteric surfactant may be a carboxybetaine-type surfactant, and the non-ionic surfactant may be at least one selected from the group consisting of polyoxyethylene alkyl ether, polyoxyethylene glycerin fatty acid ester, polyethylene glycol fatty acid ester and fatty acid alkanolamide.

Among the surfactants, a cationic surfactant such as a fatty acid quaternary ammonium salt is preferable for sterilizing power, and may be, specifically, benzalkonium chloride, dodecyl di(aminoethyl) glycine HCl (Tego), n-Alkyl dimethylbenzyl ammonium chloride, or n-alkyl dimethyl ethylbenzyl ammonium chloride. However, the present invention is not limited thereto.

The stabilizer containing boron and molybdenum may be a mixture of a boron-containing compound and a molybdenum-containing compound.

The boron may be any one of mixed powders in which boron is mixed, and may include, specifically, boric acid. A material providing the boron may include boric acid, and a content of the boron may be 0.05 wt % or more with respect to the total weight of the chlorine dioxide composition of the present invention. The upper limit thereof is not limited, but specifically, 0.05 to 0.5 wt %, and more specifically, 0.09 to 0.2 wt % may be used as examples. However, the present invention is not limited thereto.

A material providing the molybdenum may be any one of mixed powders in which molybdenum is mixed and molybdenum-containing salts, and specifically, sodium molybdate. The molybdenum may be 0.0005 wt % or more with respect to the total weight of the chlorine dioxide composition of the present invention. The upper limit thereof is not limited, and may be, specifically, 0.0005 to 0.05 wt %%, and more specifically, 0.01 to 0.03 wt %.

The stabilizer containing boron and molybdenum may be a mixture of a boron-containing compound and a molybdenum-containing compound, and here, the boron and molybdenum may be contained in a mixing ratio of 1:0.01 to 1, and preferably, 1:0.05 to 0.5, and in this ratio range, room temperature storage stability may be more improved, and thus this range is more preferable. However, the present invention is not limited thereto.

In the present invention, as the stabilizer containing boron and molybdenum is included as a component for the chlorine dioxide composition, it was found that even when the chlorine dioxide composition is stored at room temperature for a long time, the concentration of chlorine dioxide is constant, and the degree of change is small so that storage stability at room temperature is significantly improved.

In addition, the chlorine dioxide composition of the present invention may further include an antifoaming agent for controlling the bubble generation by a surfactant. The antifoaming agent may be, for example, a silicone-based antifoaming agent or liquid paraffin. However, the present invention is not limited thereto.

To implement the weakly acidic chlorine dioxide composition of the present invention finally obtained herein, specifically, to adjust pH to 5 to 6, an additional pH adjuster may be further included. As the pH adjuster, sodium dihydrogen phosphate ($NaH_2PO_4$), an inorganic acid such as diluted hydrochloric acid, an organic acid such as citric acid, acetic acid or fumaric acid, or an acidic high-molecular compound such as polyacrylic acid may be used, but the present invention is not limited thereto.

As the chlorine dioxide composition of the present invention may also include a chlorate, a chlorite, a stabilizer containing boron and molybdenum, and a surfactant in the chlorine dioxide aqueous solution, the composition may be stabilized at room temperature, and exhibit excellent effects of room temperature stability and long-term storage stability such that the concentration of chlorine dioxide at the early stage of preparation is maintained over a long period of time without a change even at room temperature during the period of long-term storage. In addition, it can be expected that the chlorine dioxide composition will revitalize distribution and sales by improving inconvenience caused in the field.

The concentration of chlorine dioxide in the chlorine dioxide composition of the present invention is maintained according to the following principle. The chlorine dioxide is decomposed by a reaction shown in Formula (1) below:

$$NaClO_2 + H_2O \rightarrow HClO_3 \quad \text{Formula (1)}$$

However, when maintained weakly acidic at pH of 5 to 6, the sodium chlorate and sodium chlorite added as described in the present invention are converted into chloric acid (Formula (2)), and into chlorous acid (Formula (3)), respectively.

$$NaClO_3 + H+ \rightarrow Na+ + HClO_3 \quad \text{Formula (2)}$$

$$NaClO_2 + H+ \rightarrow Na+ + HClO_2 \quad \text{Formula (3)}$$

The chloric acid ($HClO_3$) and chlorous acid ($HClO_2$), which are produced from these two reactions, suppress the progression of the forward reaction of the equilibrium reaction in Formula (1) and suppress the decomposition of chlorine dioxide by Formula (1), bringing about a long-term concentration maintenance effect. That is, according to the thermodynamic principle, the forward reaction, that is, the decomposition of chlorine dioxide in the equilibrium reaction of Formula (1) is suppressed as much as possible.

The chlorine dioxide composition of the present invention has little change in concentration during long-term room temperature storage. Specifically, the chlorine dioxide composition of the present invention has a long-term concentration change rate (%) represented by Formula (4) of within 10%.

$$\text{Long-term concentration change rate (\%)} = \{(A1-A2) \div A1\} \times 100 \quad \text{Formula (4)}$$

In Formula (4), A1 is the maximum concentration value during room temperature storage, and A2 is the minimum concentration value during room temperature storage.

The long-term storage method of the chlorine dioxide composition of the present invention is for maintaining the initial concentration of chlorine dioxide by maintaining the chlorine dioxide composition of the present invention prepared by the above-described method to be weakly acidic, specifically, a pH of 5 to 6, to suppress the above-described forward reaction of Formula (1). That is, the chlorine dioxide composition is maintained weak acidity, and satisfies Formula (4).

The chlorine dioxide composition of the present invention may be dissolved in a low-toxic high-pressure gas such as LPG, liquified butane or dimethyl ether, and form a chlorine dioxide propellant. As the high-pressure gas, a common high-pressure gas that can be used as a propellant, can be widely applied, but the present invention is not limited thereto.

The method of preparing a chlorine dioxide composition of the present invention includes forming a mixed solution by adding a chlorate and a chlorite to a chlorine dioxide aqueous solution, and stirring the resulting solution at room temperature; and adding a stabilizer containing boron and molybdenum and a surfactant to the mixed solution.

Specifically, the method of the present invention includes forming a mixed solution by adding 0.05 to 1 wt % of a chlorate and 0.2 to 2 wt % of a chlorite with respect to 1 L of a chlorine dioxide aqueous solution containing 1 to 2000 mg/L chlorine dioxide and stirring the mixed solution at room temperature; and adding 0.01 to 0.5 wt % of a surfactant, 0.05 to 0.5 wt % of boron and 0.0005 to 0.05 wt % of molybdenum to the mixed solution. The chlorate, chlorite, surfactant and stabilizer containing boron and molybdenum are the same as in the above description of the chlorine dioxide composition. The chlorine dioxide composition prepared as described above has penetrating bactericidal efficacy.

Hereinafter, the present invention will be described in further detail based on Examples and Comparative Examples. However, the following Examples and Comparative Examples are merely provided to describe the present invention in further detail and not to limit the present invention.

[Method of Measuring Physical Properties]

1. Method of Measuring Concentration of Chlorine Dioxide (1) A tablet is dissolved in water with a weight 1000 times the weight of the tablet. A selected container is a brown mass flask that can be protected from light. The tablet is dissolved within 10 minutes, and bubbles and yellow chlorine dioxide are generated with dissolution.

(2) 100 mL of distilled water, phosphate buffered saline (pH 7.2, Aldrich), 10 to 50 mL of a chlorine dioxide solution for measuring a concentration and a 10 mL potassium iodine solution (concentration: 50 g/L, Aldrich) are added to a 500 mL iodine flask, and then uniformly mixed. pH measured from an acid detector was maintained at 7 using phosphate buffered saline. After the mixed solution is titrated with a sodium thiosulfate solution having a molar concentration of 0.01 until its color turns light yellow, 1 mL of a starch solution (concentration: 1 g/100 ml, Aldrich) was added so that the color of the solution turns blue, followed by continuing titration until the color of the mixed solution disappears. The volume of the consumed sodium thiosulfate solution is denoted by A.

(3) 2.5 mL of a hydrochloric acid solution having a molar concentration of 2.5 is added to the solution titrated in (2), and placed in a dark place for 5 minutes. Titration is performed using a sodium thiosulfate solution having a molar concentration of 0.01 until the color of the mixed solution disappears. The volume of the consumed sodium thiosulfate solution is denoted by B.

(4) 100 mL of distilled water, phosphate buffered saline (pH 7.2, Aldrich), and a 50 mL chlorine dioxide solution (or a diluent thereof) are added into a 500 mL iodine flask and then uniformly mixed, followed by adjusting pH to 7 by adding phosphate buffered saline. In addition, until the color of the solution changes from dark to light, high purity nitrogen is added for approximately 20 minutes to remove chlorine dioxide. Titration is performed using sodium thiosulfate having a molar concentration of 0.01 until the color of the mixed solution changes to light yellow by addition of 10 mL of a potassium iodide solution, and then changes to blue by adding 1 mL of a starch solution (concentration: 1 g/100 ml, Aldrich) to the mixed solution and continues until the color of the mixed solution disappears. The volume of the consumed sodium thiosulfate solution is denoted by C.

(5) 2.5 mL of a hydrochloric solution having a molar concentration of 2.5 is added to the solution titrated in (4), and placed in a dark place for 5 minutes. Titration is performed using a sodium thiosulfate solution having a molar concentration of 0.01 until the color of the mixed solution disappears. The volume of the consumed sodium thiosulfate solution is denoted by D.

(6) Calculation method $$ClO_2 \text{ concentration (mg/L)} = (B-D) \times c \times 16863 \div V \quad \text{[Equation]}$$

In this equation, B and D represent volumes (mL) of consumed sodium thiosulfate solutions, V represents the volume (mL) of a chlorine dioxide solution, and c represents the concentration (mol/L) of a sodium thiosulfate solution.

(7) The detection limit of this method is 0.1 mg/L, a yield is 98.0%, and a relative standard deviation (RSD) is 10% or less.

Example 1

A weakly acidic aqueous solution of pH 5.5 was prepared by adding 7.1 mL of a 25% sodium chlorite aqueous solution and 3 g of sodium chlorate to 1 L of a 2000-ppm chlorine dioxide aqueous solution, and adding 10 mL of an 8% $NaH_2PO_4$ aqueous solution. After stirring the resulting solution at room temperature for 10 minutes, 2 mL of a 10% benzalkonium chloride aqueous solution as a surfactant, and 1 g of boric acid and 0.05 g of sodium molybdate as stabilizers were added, and then the resulting solution was stirred for 10 minutes, thereby preparing a chlorine dioxide composition in which the initial concentration of chlorine dioxide is 2,000 ppm.

Example 2

A weakly acidic aqueous solution of pH 5.5 was prepared by adding 5.1 mL of 25 wt % sodium chlorite and 1.5 g of sodium chlorate to 1 L of an 80-ppm chlorine dioxide aqueous solution, and then adding 40 mL of a 5% $NaH_2PO_4$ aqueous solution. A chlorine dioxide composition in which an initial concentration of chlorine dioxide is 80 ppm was prepared by stirring the resulting solution at room temperature for 10 minutes, adding 4 mL of a 10% benzalkonium chloride aqueous solution as a surfactant, and 1 g of boric acid and 0.05 g of sodium molybdate as stabilizers, and stirring the mixture for 10 minutes.

Example 3

A weakly acidic aqueous solution of pH 5.5 was prepared by adding 4.1 mL of 25 wt % sodium chlorite and 1 g of sodium chlorate to 1 L of a 20-ppm chlorine dioxide aqueous solution, and adding 20 ml of 10 wt % $NaH_2PO_4$. A chlorine dioxide composition in which an initial concentration of chlorine dioxide is 20 ppm was prepared by stirring the resulting solution at room temperature for 10 minutes, adding 3 mL of a 1% benzalkonium chloride aqueous solution as a surfactant, and 1 g of boric acid and 0.05 g of sodium molybdate as stabilizers, and stirring the mixture for 10 minutes.

Comparative Example 1

A chlorine dioxide composition was prepared in the same manner as in Example 1, except for boric acid and sodium molybdate used as stabilizers in Example 1.

Comparative Example 2

A chlorine dioxide composition was prepared in the same manner as in Example 2, except for boric acid and sodium molybdate used as stabilizers in Example 2.

Comparative Example 3

A chlorine dioxide composition was prepared in the same manner as in Example 3, except for boric acid and sodium molybdate used as stabilizers in Example 3.

The stability characteristics of the chlorine dioxide compositions obtained in Examples 1 to 3 and Comparative Examples 1 to 3 were evaluated. For stability evaluation, the chlorine dioxide compositions of Examples 1 to 3 were actually stored at room temperature for 13 months, samples were obtained every month to measure the concentration of chlorine dioxide in a composition, as measured by an iodine measurement method. The measured concentrations are shown in Table 1 below.

TABLE 1

| | Concentration (unit: ppm) | | | | | |
|---|---|---|---|---|---|---|
| Time | Example 1 | Example 2 | Example 3 | Comparative Example 1 | Comparative Example 2 | Comparative Example 3 |
| Initial | 2002 | 80.4 | 20.5 | 2002 | 80 | 20.3 |
| After 3 months | 2000 | 79.1 | 21.2 | 1997 | 56 | 17.2 |
| After 6 months | 2002 | 80.9 | 19.9 | 1850 | 42 | 10.1 |
| After 9 months | 2003 | 80.1 | 20.2 | 1700 | 20.4 | — |
| After 12 months | 2002 | 80.6 | 19.9 | 1680 | 9.9 | — |

Change rates of the maximum and minimum concentration values of the chlorine dioxide for 13-month storage of the chlorine dioxide compositions obtained in Examples 1 to 3 and Comparative Examples 1 to 3 at room temperature, derived by the following Formula (4), are listed in Table 2 below.

Long-term concentration change rate (%)={(A1−A2)÷A1}×100     Formula (4)

In Formula (4), A1 is the maximum concentration value during room temperature storage, and A2 is the minimum concentration value during room temperature storage.

TABLE 2

| | Maximum concentration of chlorine dioxide during 13-month storage (A1) | Minimum concentration of chlorine dioxide during 13-month storage (A2) | Change rate (%) by Formula (4) |
|---|---|---|---|
| Example 1 | 2003 | 2000 | 0.15 |
| Example 2 | 80.9 | 79.1 | 2.2 |
| Example 3 | 21.2 | 19.4 | 8.5 |
| Comparative Example 1 | 2002 | 1680 | 16.1 |
| Comparative Example 2 | 80 | 9.9 | 87.6 |
| Comparative Example 3 | 20.3 | — | — |

Figure 2:
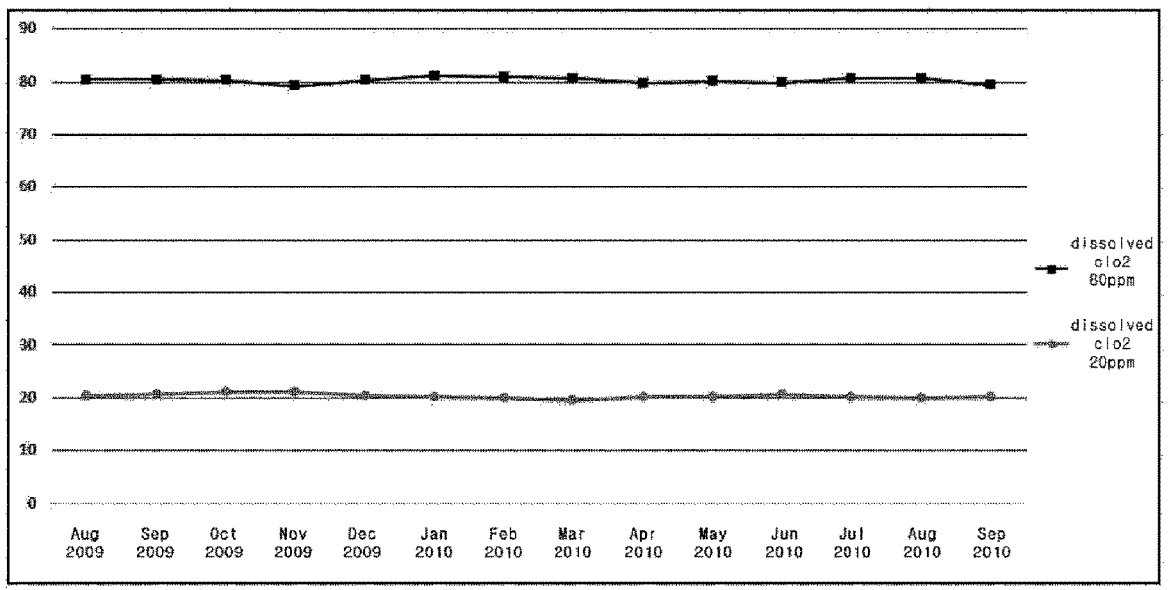
FIG. 2 is a graph showing the change in in concentration of chlorine dioxide over time (long-term stability) for compositions in which the initial concentration of the chlorine dioxides of Examples 2 and 3 are 80 ppm and 20 ppm, respectively.

FIG. 1 shows the change in concentration of chlorine dioxide (long-term stability) over time for a composition in which the initial concentration of chlorine dioxide in Example 1 is 2,000 ppm. FIG. 2 shows the changes in concentration of chlorine dioxide (long-term stability) over time for compositions in which the initial concentrations of chlorine dioxide in Examples 2 and 3 are 80 ppm and 20 ppm.

In FIGS. 1 and 2, it was confirmed that the initial concentrations of chlorine dioxide in the chlorine dioxide composition of the present invention are maintained without a significant change when stored at room temperature for one year.

In addition, as shown in Tables 1 and 2, it was seen that, by using both of boric acid and sodium molybdate in a chlorine dioxide composition, the initial concentration of chlorine dioxide in the composition is constantly maintained without a significant change during long-term storage at room temperature, and the change rate calculated by Formula (4) is within 10%.

That is, as the chlorine dioxide composition of the present invention includes both of boron and molybdenum, it can be seen that it has a more excellent room temperature storage effect.

As seen from Examples 1 to 3 and Comparative Examples 1 to 3, instead of replenishing the consumed chlorine dioxide with newly generated chlorine dioxide, the decomposition of chlorine dioxide may be inhibited and thus remain without decomposition of the initial chlorine dioxide, thereby maintaining an initial concentration thereof.

As the chlorine dioxide composition of the present invention includes all of a chlorate, a chlorite, a stabilizer containing boron and molybdenum, and a surfactant, it is preferable for realizing excellent storage stability at room temperature, and thus stability in distribution and working processes and excellent convenience is realized.

As described above, the present invention has been described with reference to specific details and limited examples and drawings, which however are merely provided to help in a more general understanding of the present invention, and the present invention is not limited to the examples. Various modifications and variations are possible from these descriptions by those of ordinary skill in the art to which the present invention belongs.

Accordingly, the spirit of the present invention should not be limited to the described examples, and those that are equal to or modified to be equivalent to the claims, as well as the accompanying claims, will belong to the scope of the spirit of the present invention.

What is claimed is:

1. A chlorine dioxide composition, comprising:
   a chlorine dioxide aqueous solution, a chlorate, a chlorite, a surfactant and a stabilizer containing boron and molybdenum, wherein a change rate of the concentration of chlorine dioxide for 13 months is within 10%, as calculated by the following Formula (4):

Long-term concentration change rate (%)={($A1-A2$)÷$A1$}×100,  [Formula (4)]

in Formula (4), A1 is the maximum concentration value during storage at room temperature, and A2 is the minimum concentration value during storage at room temperature,
   wherein the composition has a pH value of pH 5 to 6,
   wherein the chlorate is in an amount of 0.05 to 1 wt. %
      wherein the chlorate is sodium chlorate in an amount of 0.1 to 0.8 wt. % with respect to 1 L of the chlorine dioxide aqueous solution containing 1 to 2000 mg/L chlorine dioxide,
   wherein the chlorite is in an amount of 0.2 to 2.0 wt. %
      wherein the chlorite is sodium chlorite in an amount of 0.5 to 1.8 wt. %, with respect to 1 L of the chlorine dioxide aqueous solution containing 1 to 2000 mg/L chlorine dioxide,
   wherein the surfactant is in an amount of 0.01 to 0.5 wt % with respect to 1 L of the chlorine dioxide aqueous solution containing 1 to 2000 mg/L chlorine dioxide,
   wherein the boron is in an amount of 0.05 to 0.5 wt. %
      wherein the boron is boric acid in an amount of 0.09 to 0.2 wt. % with respect to the total weight of the chlorine dioxide composition,
   wherein the molybdenum is in an amount of 0.005 to 0.05 wt. % wherein the molybdenum is sodium molybdenum in an amount of 0.01 to 0.03 wt. % with respect to the total weight of the chlorine dioxide composition,
   wherein the boron and molybdenum are in a ratio of 1:0.05 to 0.5 by wt. %,
   wherein the composition has a pH value of pH 5.5,
   wherein the pH adjuster is $NaH_2PO_4$.

2. The chlorine dioxide composition of claim 1, wherein the surfactant includes at least one selected from the group consisting of a cationic surfactant, an anionic surfactant, an amphoteric surfactant, a non-ionic surfactant, a fluorine surfactant and a saponin.

3. The chlorine dioxide composition of claim 1, further comprising an antifoaming agent.

4. A method of preparing the chlorine dioxide composition of claim 1, comprising:
   forming a mixed solution by adding the chlorate and the chlorite to the chlorine dioxide aqueous solution, and stirring the resulting solution at room temperature; and adding the stabilizer containing boron and molybdenum and the a surfactant to the mixed solution,
   wherein a change rate of the concentration of chlorine dioxide for 13 months is within 10%, as calculated by the following Formula (4):

Long-term concentration change rate (%)={($A1-A2$)÷$A1$}×100  [Formula (4)]

in Formula (4), A1 is the maximum concentration value during storage at room temperature, and A2 is the minimum concentration value during storage at room temperature.

5. The chlorine dioxide composition of claim 4, wherein the surfactant includes at least one selected from the group consisting of a cationic surfactant, an anionic surfactant, an amphoteric surfactant, a non-ionic surfactant, a fluorine surfactant and a saponin.

6. The method of claim 4, in the step of adding the surfactant, further comprising:
   adding an antifoaming agent for controlling the bubble generation by the surfactant.

7. A chlorine dioxide propellant, in which the chlorine dioxide composition of claim 1 is dissolved in a high-pressure gas, and the high-pressure gas includes at least one selected from the group consisting of liquefied natural gas (LPG), liquefied butane and dimethyl ether.

* * * * *